(12) United States Patent
Brown et al.

(10) Patent No.: US 7,143,085 B2
(45) Date of Patent: Nov. 28, 2006

(54) OPTIMIZATION OF SERVER SELECTION USING EUCLIDEAN ANALYSIS OF SEARCH TERMS

(75) Inventors: Gregory T. Brown, Rockmart, GA (US); Youssef Drissi, Ossining, NY (US); Moon Ju Kim, Wappingers Falls, NY (US); Lev Kozakov, Stamford, CT (US); Juan Leon-Rodriquez, Danbury, CT (US); Ricardo Vilalta, Houston, TX (US)

(73) Assignee: International Business Machines Corporatin, Armonk, NY (US)

( * ) Notice: Subject to any disclaimer, the term of this patent is extended or adjusted under 35 U.S.C. 154(b) by 442 days.

(21) Appl. No.: 10/209,619

(22) Filed: Jul. 31, 2002

(65) Prior Publication Data
US 2004/0024748 A1   Feb. 5, 2004

(51) Int. Cl.
*G06F 7/00* (2006.01)
(52) U.S. Cl. ............... 707/3; 707/1; 707/2; 707/6; 707/7; 708/200; 708/490; 715/500; 715/700; 715/764; 715/848
(58) Field of Classification Search ............... 707/1–3, 707/5–7; 708/200, 490; 715/500, 700, 764, 715/848
See application file for complete search history.

(56) References Cited

U.S. PATENT DOCUMENTS

| | | | | |
|---|---|---|---|---|
| 5,794,178 A | * | 8/1998 | Caid et al. | 704/9 |
| 6,629,097 B1 | * | 9/2003 | Keith | 707/5 |
| 6,836,777 B1 | * | 12/2004 | Holle | 707/101 |

OTHER PUBLICATIONS

Jain et al., Data Clustering: A Review, 1999, ACM Computing Surveys, vol. 31, pp. 265-323.*

* cited by examiner

*Primary Examiner*—Tim Vo
*Assistant Examiner*—Hung Pham
(74) *Attorney, Agent, or Firm*—Norman Gundel

(57) ABSTRACT

Euclidean analysis is used to define queries in terms of a multi-axis query space where each of the keywords $T_1$, $T_2, \ldots T_i, \ldots T_n$ is assigned an axis in that space. Sets of test queries $S_t$ for each one from one of a plurality of server sources, are plotted in the query space. Clusters of the search terms are identified based on the proximity of the plotted query vectors to one another. Predominant servers are identified for each of the clusters. When a search query $S_s$ is received, the location of its vector is determined and the servers accessed by the search query $S_s$ are those that are predominant in the cluster which its vector may fall or is in closest proximity to.

10 Claims, 8 Drawing Sheets

US 7,143,085 B2

OPTIMIZATION OF SERVER SELECTION USING EUCLIDEAN ANALYSIS OF SEARCH TERMS

RELATED APPLICATIONS

U.S. Pat. No. 6,886,009, filed on even date herewith and entitled "Query Routing Based on Feature Learning of Data Sources."

FIELD OF THE INVENTION

The present invention relates to performing database searches on network databases. More particularly, the present invention relates to selection of servers to be interrogated by the search terms.

BACKGROUND OF THE INVENTION

Internet text retrieval systems accept a statement of requested information in terms of a search query S made up of a plurality of keywords $T_1, T_2, \ldots T_i, \ldots T_n$ and return a list of documents ranked in order of how well the documents match the search query. The need to search the databases has resulted in development of search engines that provide a query interface to the information containing sources and return search results ranked sequentially to direct search processing of the databases. However, the use of these search engines has not resulted in completely acceptable results. The search engines process search interrogations in different ways and as a result the same query will result in different results from the different engines. Further, with the expansion of the world wide web, databases and search engines available for search have multiplied to the extent that the amount of data available to users has increased dramatically. The result is an information overload for the user. It has been found that when general purpose search engines are used in searching voluminous, imprecise, and varying results are obtained. When topic specific engines are used, the searchers judgment in selecting the appropriate search engines and the search engine providers biases relative to the information provided introduce search errors.

Because of the above and other considerations, obtaining accurate results from searches for information on the Internet can be very time consuming for a searcher attempting to search all apparently relative sources. Moreover, the information processing resources and man hours necessary to support such searching can be expensive and may diminish interest in searching the Internet. What is needed to overcome information overload in a distributed information system, such as the Internet, is an automated system and method of information retrieval which optimally selects sources or databases most likely to provide the best response to a user. A number of ways have been suggested to select those search engines that will provide the most accurate search. However, these past suggestions have not resulted in completely acceptable results.

Therefore it is an object of the present invention to provide an improved query routing system.

It is further an object of the present invention to provide a query routing system based on previous search results using one or more search terms in the query.

Further, an object of the present invention is to limit search interrogations to servers providing best results in previous searches using one or more of the search terms.

BRIEF DESCRIPTION OF THE INVENTION

In accordance with the present invention, Euclidean analysis is used to define queries in terms of a multi-axis query space where each of the keywords $T_1, T_2, \ldots T_i, \ldots T_n$ is assigned an axis in that space. Sets of test queries $S_t$, each one from one of a plurality of server sources are plotted as vectors in the query space. Clusters of the search terms are identified based on the proximity of the plotted query vectors to one another. Predominant servers are identified for each of the clusters. When a search query $S_s$ is received, the location of its vector is determined and the servers accessed by the search query $S_s$ are those that are predominant in the cluster which its vector may fall or is in closest proximity to.

DETAILED DESCRIPTION OF THE INVENTION

Figure 1:
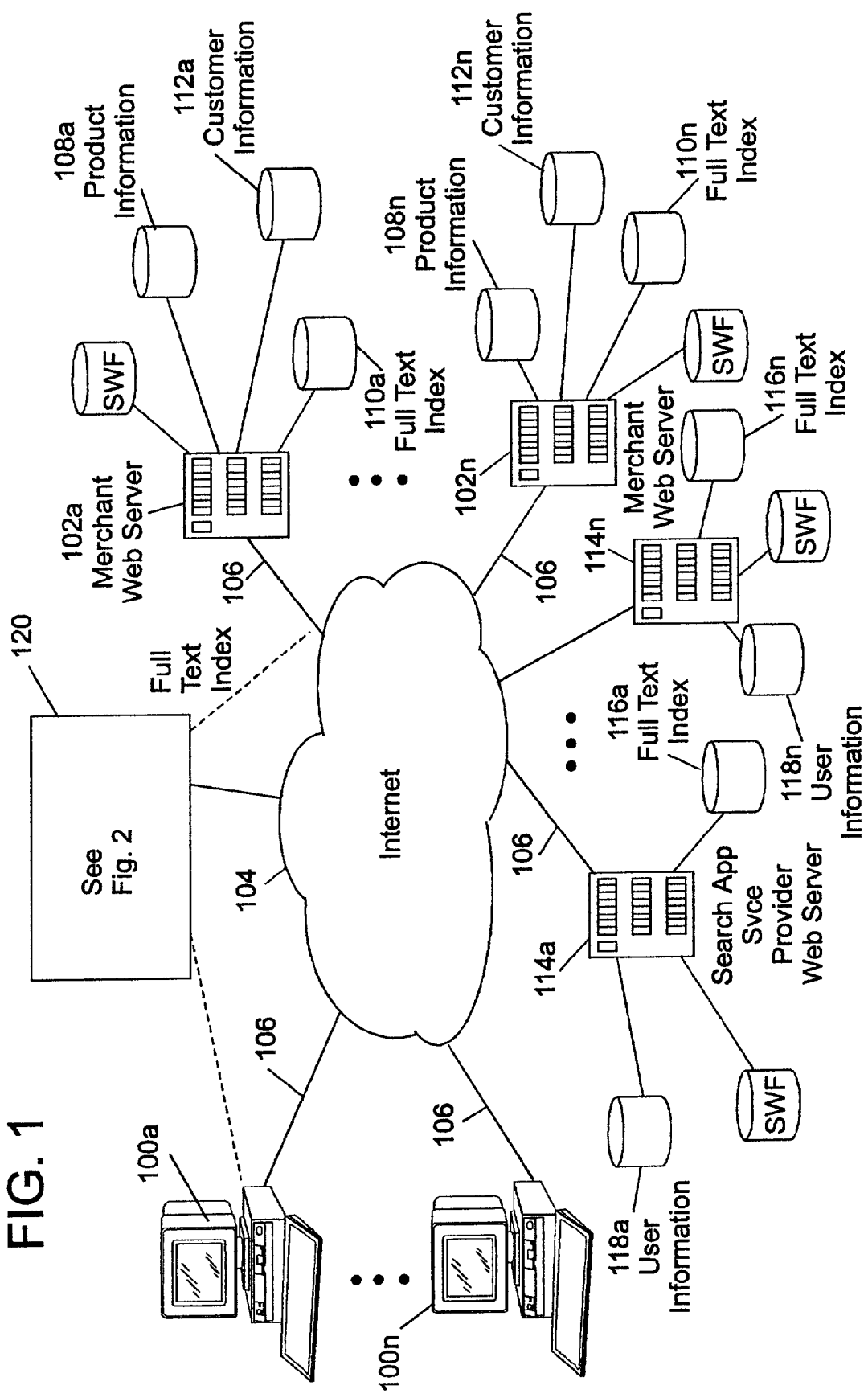
FIG. 1 is a schematic diagram for system organization of an on-line area network.

Referring now to FIG. 1, communication between a plurality of user computers 100a to 100n and a plurality of information servers 102a to 102n is accomplished via an on-line service through a wide area network such as the Internet 104 that includes network node servers. The network node servers manage network traffic such as the communications between any given user's computer and an information server.

The computers 100 are equipped with communications software, including a WWW browser such as the Netscape browser of Netscape Communications Corporation, that allows a shopper to connect and use on-line shopping services via the Internet. The software on a user's computer 100 manages the display of information received from the servers to the user and communicates the user's actions back to the appropriate information servers 102 so that additional display information may be presented to the user or the information acted on. The connections 106 to the network nodes of the Internet may be established via a modem or other means such as a cable connection.

The servers illustrated in FIG. 1, and discussed hereafter, are those of merchants. While the following discussion is directed at communication between shoppers and merchants over the Internet, it is applicable to any information seeker and any information provider on a network. (For instance, the information provider can be a library such as a University library, the public library or the Library of Congress or other type of information providers.) Information regarding a merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, and other information providers, there are the servers 114a to 114 of plurality of search service providers, such as Google of Google, Inc., which maintain full text indexes 116 of the products of the individual merchants 102a to 102n obtained by interrogating the product information databases 108 of the individual merchants. Some of these search service providers, like Google, are general purpose search providers while others are topic specific search providers.

FIG. 1 shows an information consolidator 120. An information consolidator obtains information from various ones of the merchant servers 102 and those of the search application service providers 114 and supplies it to a user. The information consolidator may be an independent source for data, or as shown by the dotted lines, associated with either a merchant 102a providing the data or be the user 100a obtaining the data.

The information consolidator provides added value by modification of the data it receives from its sources. As pointed out, the ranking of data provided by the merchant or search application service provider varies from that provided by raw ranking element data either to be helpful to the user or to add biases of the data provider. For instance, the merchants and the search application service providers each may maintain a database of information about shoppers and their buying habits to customize on-line shopping for the shopper. Operations to accomplish a customized electronic shopping environment for the shopper include accumulating data regarding the shopper's preferences. Data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g. age, address, hobbies) regarding the shopper as provided by the shopper when subscribing to the service. The data accumulation on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

When the search characteristics in the form for key words are entered by the shopper into the space provided on the default or home page of his/her browser, the search engine of the merchant web server 102 does a search of the accessed full text index database 110 or 118 using the key words and gets a list of documents describing those products and services that contain matches to the key words. This list of documents contain basic test ranking Tf (including the number of hits, their location, etc. which are used to order the list of documents) with documents with higher scores at the top. This list is then sent to the ranking module 204 which will apply a ranking algorithm, such as the one described in the article entitled "The Anatomy of a Large-Scale Hypertextual Web Search Engine" by Sergey Brin and Lawrence Page of the Computer Science Department, Stanford University, Stanford Calif. 94305 (which article is hereby incorporated by reference) to rank the list of documents using the text factors and other rank factors, such as link analysis, popularity, the user's preferences from the users profile, and may also introduce factors reflecting the information, providers biases and interests. A reordered list of documents based on the ranking algorithm is then provided to the user.

Figure 2:
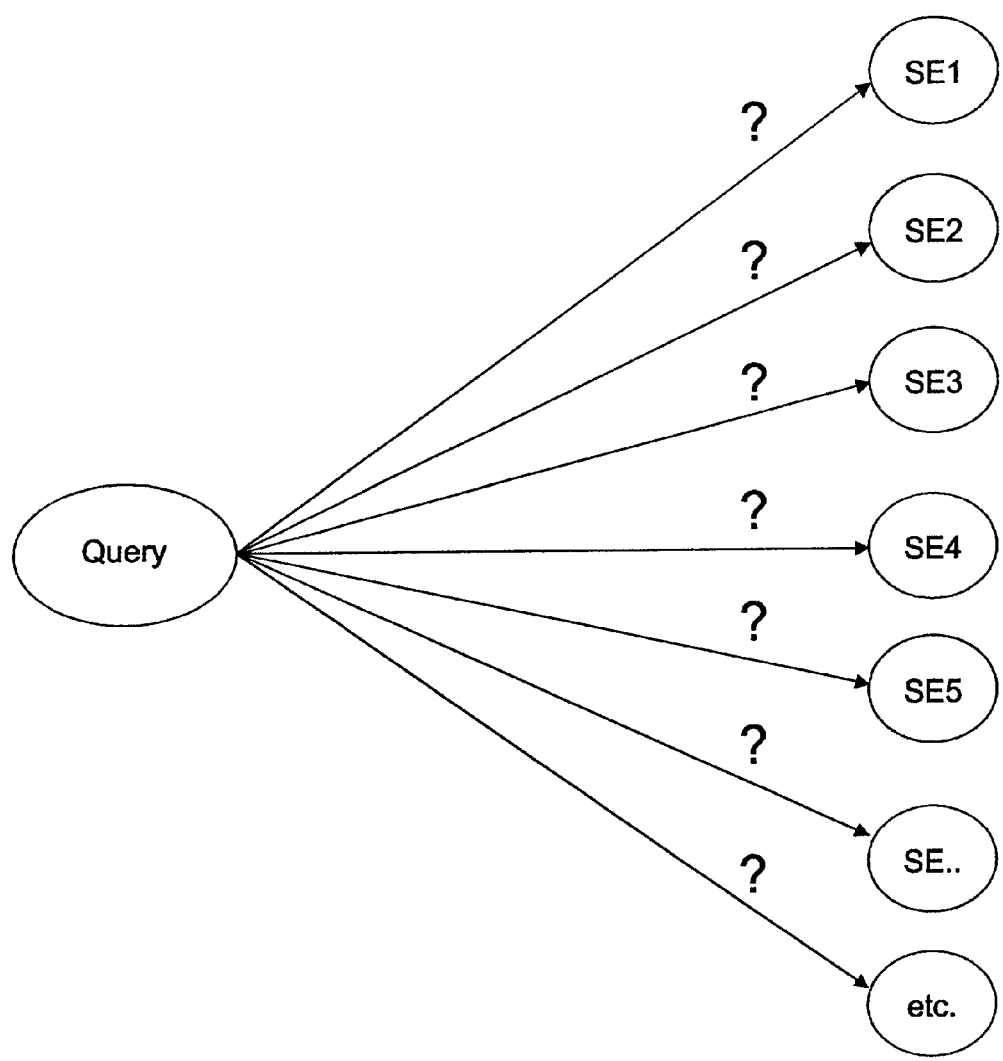
FIG. 2 is a schematic diagram showing interrogation of all the servers shown in FIG. 1.

Referring now to FIG. 2, it shows the servers SE1 through SEn each being interrogated by search engine based on a search query introduced into a computer. As pointed out above, it has been found that when general purpose search engines are used in the searching of the worldwide web, voluminous and imprecise results are obtained. Topic specific search engines could provide more precise search results. However, the biases of the search source provider and the ability of the searcher to select the proper topics specific search engines affects the ability to obtain desirable results. Further, all search results can be affected by the result modification techniques mentioned in connection with FIG. 1. In accordance with the present invention, selection of the most pertinent search sources is provided based on the identification of the predominant sources for particular categories of queries.

Figure 3:
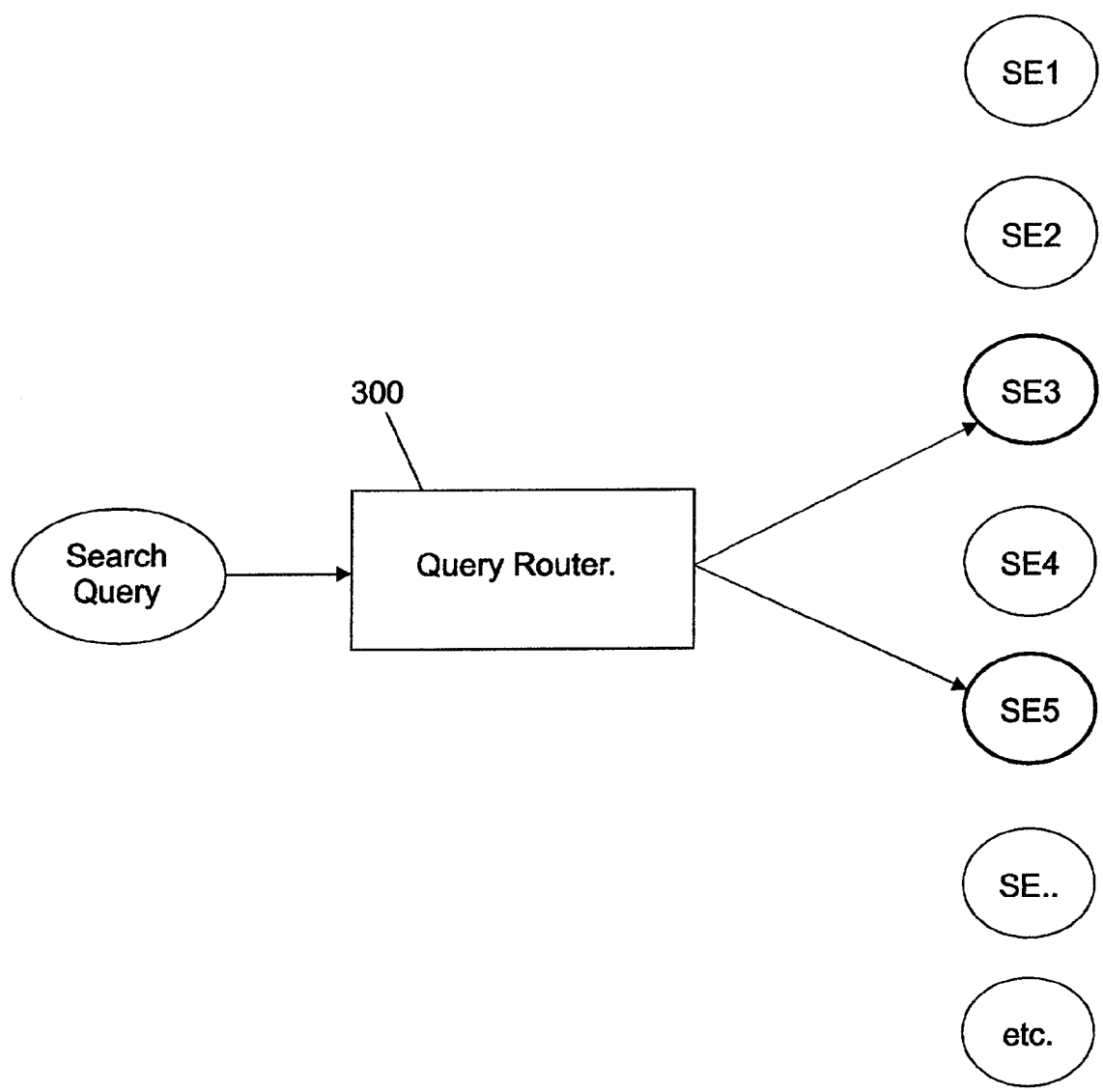
FIG. 3 is a schematic diagram showing use of a query routine for selection of a limited number of servers.

FIG. 3 shows a query router 300 which is configured to limit search sources that are interrogated to those that are dominant in the information domain interrogated by the keywords contained in a query. The sources selected will vary depending on the information domain interrogated by the keywords of the query. For one set of keywords, servers SE3 and SE5, dominant in one information domain, may be selected. However with other combinations of keywords, a different information domain is interrogated and the sources selected may be SE2 to SE4 or any other combination of the various sources SE1 to SEn.

Figure 4:
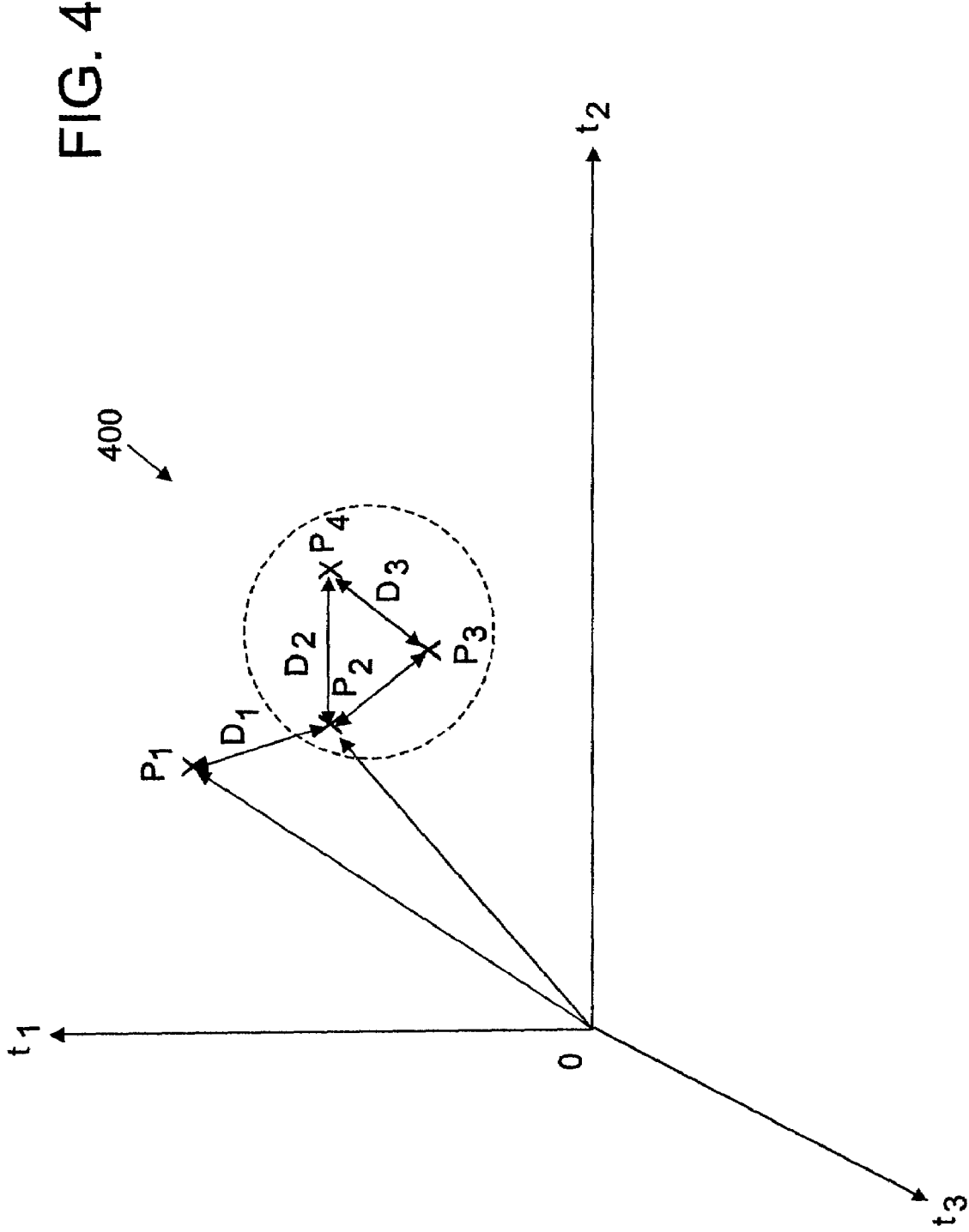
FIG. 4 is a schematic diagram showing how queries made to the network shown in FIG. 1 can be defined in a query space for Euclidean analysis.

Referring now to FIG. 4, assuming three computer readable search terms each of the terms T1, T2 and T3 are assigned an axis, $t_1$, $t_2$, $t_3$ respectively, to define search queries in terms of a three dimensional query space. The illustrated dictionary includes only three computer readable search terms to facilitate the understanding of the present invention. Of course, there are more than three search terms in a true dictionary of computer readable search terms. In a dictionary of n terms each term $T_i$ is assigned an axis so that the search terms are defined in a n-axis query space.

As shown, query $S_1$ made up of search terms T1, T2, T1, and T3 defines one point $P_1$ in the three-dimensional query space of FIG. 4 while query $S_2$, with search terms T2, T3, T3 and T1, defines another point $P_2$ in the query space of FIG. 4. It is noted that there are multiple occurrences of a search term in both of the queries $S_1$ and $S_2$. Each occurrence of a search term is plotted as a separate increment in the query space so that the vector for query $S_1$ contains two increments along the $t_1$ axis while the vector for query $S_2$ extends two increments along the $t_3$ axis. Euclidean distance D is defined as the length of the line between the points P defined by mapped query vectors. Thus the distance between the vectors of queries $S_1$ and $S_2$ is D. As more query vectors are added to the query space, the distance between the various mapped queries in the space varies. For instance when the third query $S_3$ is added, the distance $D_2$ between $S_1$ and $S_3$ is less than the distance D. As a fourth query $S_4$ is added, even a smaller distance $D_3$ is noted. By taking the Euclidean distances D and using them to divide the query space, it is noted that the queries fall into clusters where the average distance $D_a$ between the query points P in the cluster is less than the distance n $D_a$ to adjacent clusters where n is a selected multiple of $D_a$ that could be two or greater. The periphery of a cluster is the average distance $D_a$ to the peripheral queries S of the cluster. For instance, it is apparent in FIG. 4 that queries $S_2$, $S_3$ and $S_4$ are clustered together in a cluster while query $S_1$ is substantially spaced from the other three queries and is outside the cluster 400.

Figure 5:
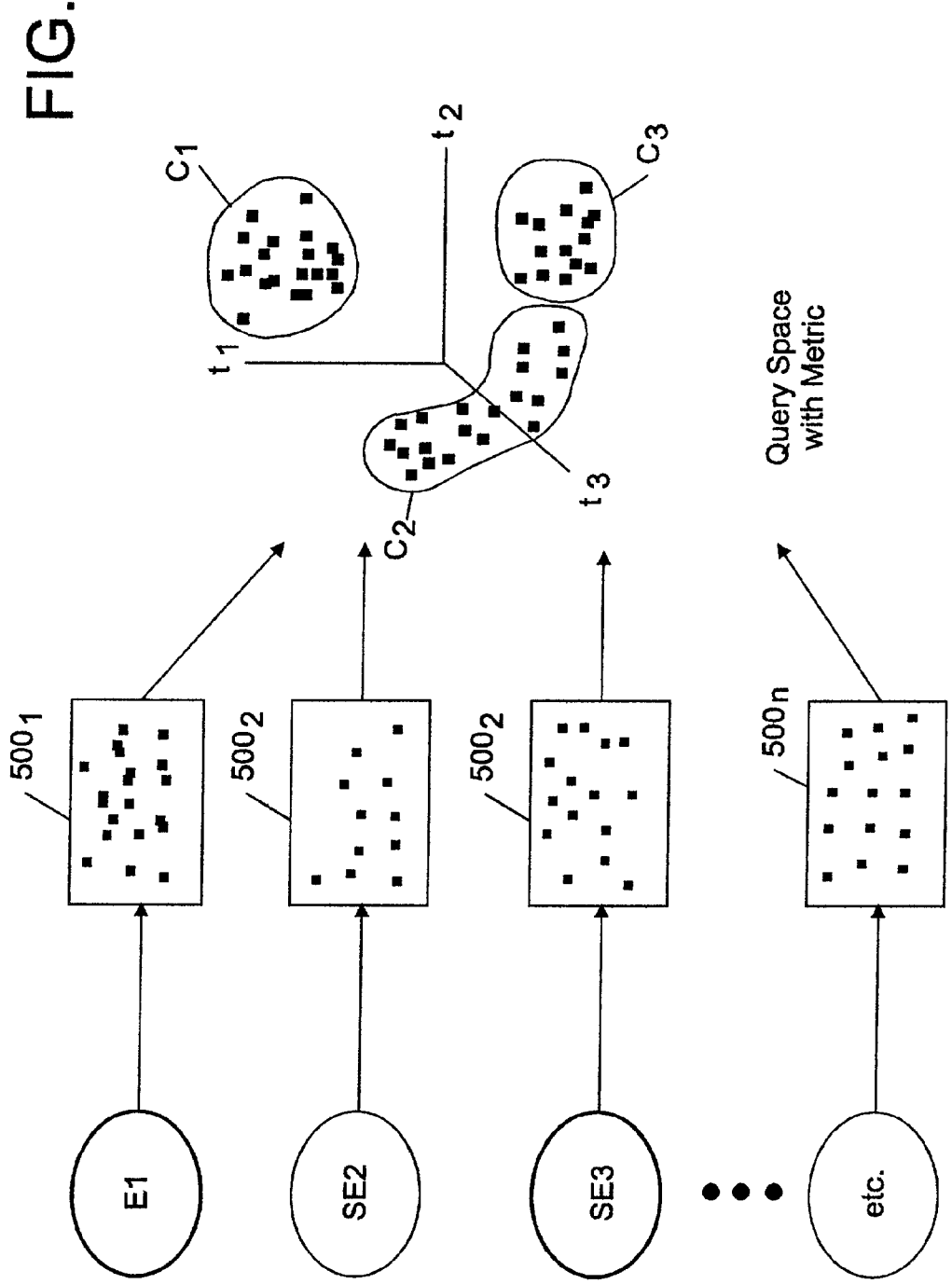
FIG. 5 is a schematic diagram that the query space of FIG. 4 populated with queries, from a plurality of servers, occurring in clusters.
Figure 6:
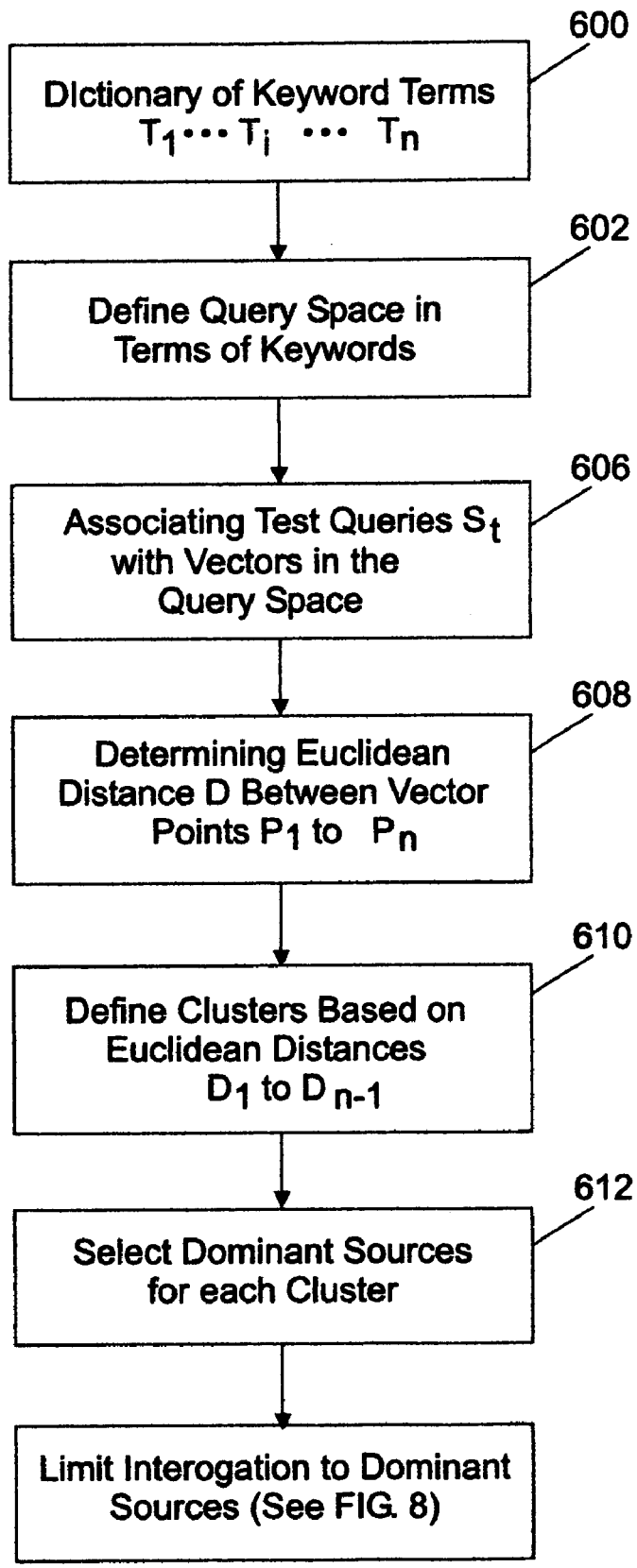
FIG. 6 is a flow diagram of the determination of the clusters identified in FIG. 5.

Referring now to FIGS. 5 and 6, the query space is filled with test queries $S_t$ from sets of such queries 500 each set typical of those used to access one of the multiple sources SE1 to SN. The typical queries $S_t$ are each made up of keywords $T_1$ to $T_n$ from a keyword dictionary and the query space is defined as having one axis for each of the keywords (steps 600 and 602). The queries are each associated with a vector and plotted in the query space to define the query points $P_1$ to $P_n$ (step 606). The clusters $C_1$, $C_2$, and $C_3$ are then defined by determining the spaces $D_1$ to $D_{n-1}$ between the query points using relative Euclidean distances ($D_a$ and n $D_a$) to determine the existence of clusters (steps 608 and 610). Then the clusters are each identified with its cluster number $C_1$, $C_2$ and $C_3$ and the servers providing the largest number of queries to a cluster are identified as the predominant sources (step 612).

Figure 7:
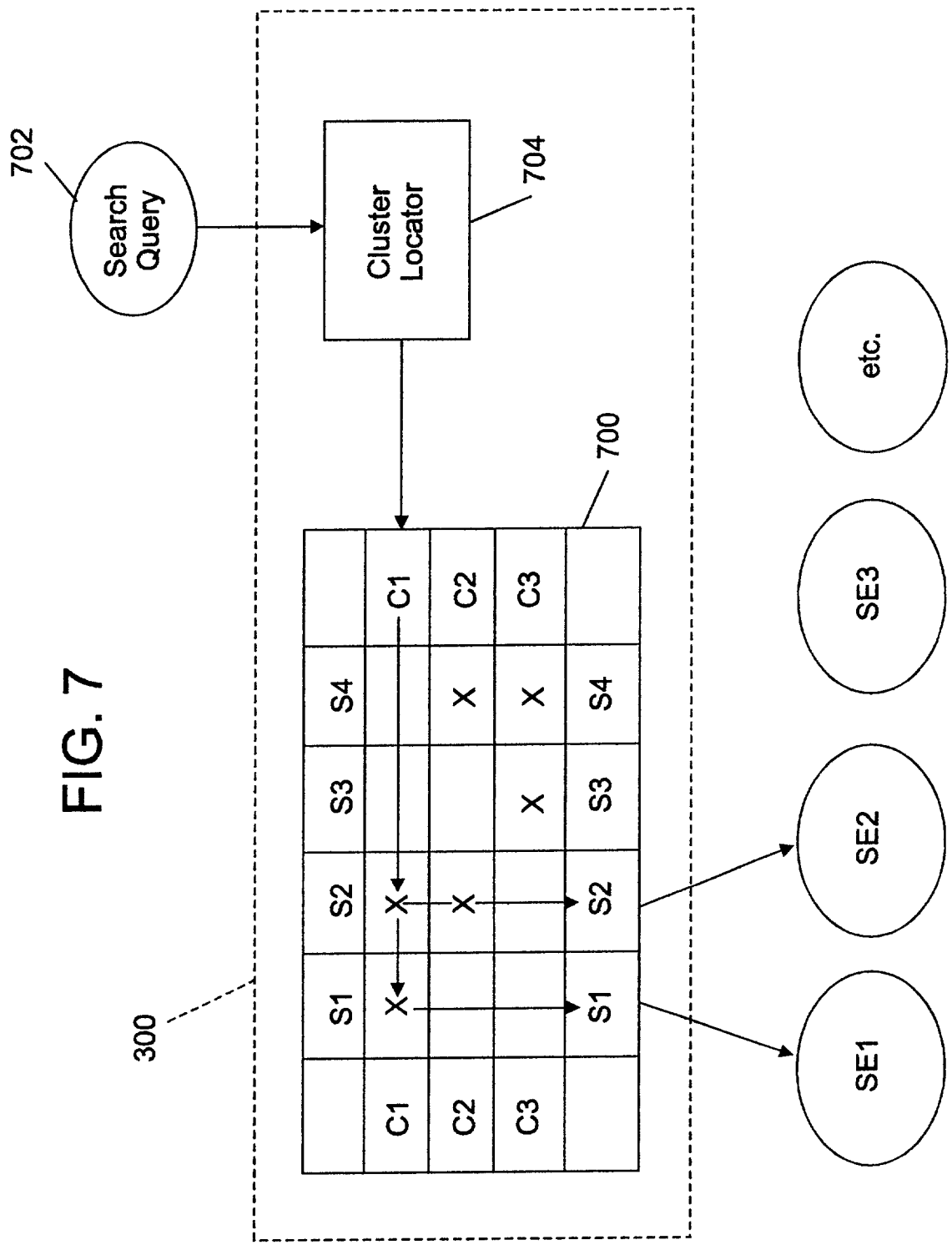
FIG. 7 is a block diagram of the query router in accordance with the present invention.

FIG. 7 illustrates a lookup table 700 in the query router 300 identifying the dominant servers of each of the clusters $C_1$, $C_2$ and $C_3$ where the servers $SE_1$, to $SE_4$ are arranged along the abscissa of the illustrated lookup table 700 while the clusters are identified along the ordinate of the illustrated lookup table. The dominant servers are identified by an X in the box associated with each row. Thus in cluster $C_1$, the predominant servers are $SE_1$ and $SE_2$ while in cluster $C_2$, the predominant servers are $SE_3$ and $SE_4$, and in cluster 3, the predominant servers are $SE_3$ and $SE_4$. While two servers are selected as dominant the number may be other than two and may vary. When searching is initiated and a query 702 is provided, classifier 704 identifies the cluster in the lookup table in which the query is located which in turn identifies the predominant servers (Those marked with Xs in the diagram). For instance, the query router 300 identifying the query as falling in cluster $C_1$ in the diagram will result in a search being done on the servers $SE_1$ and $SE_2$. Likewise, identifying one of the other clusters will result in selection of the servers marked by an X in the row containing that cluster.

Figure 8:
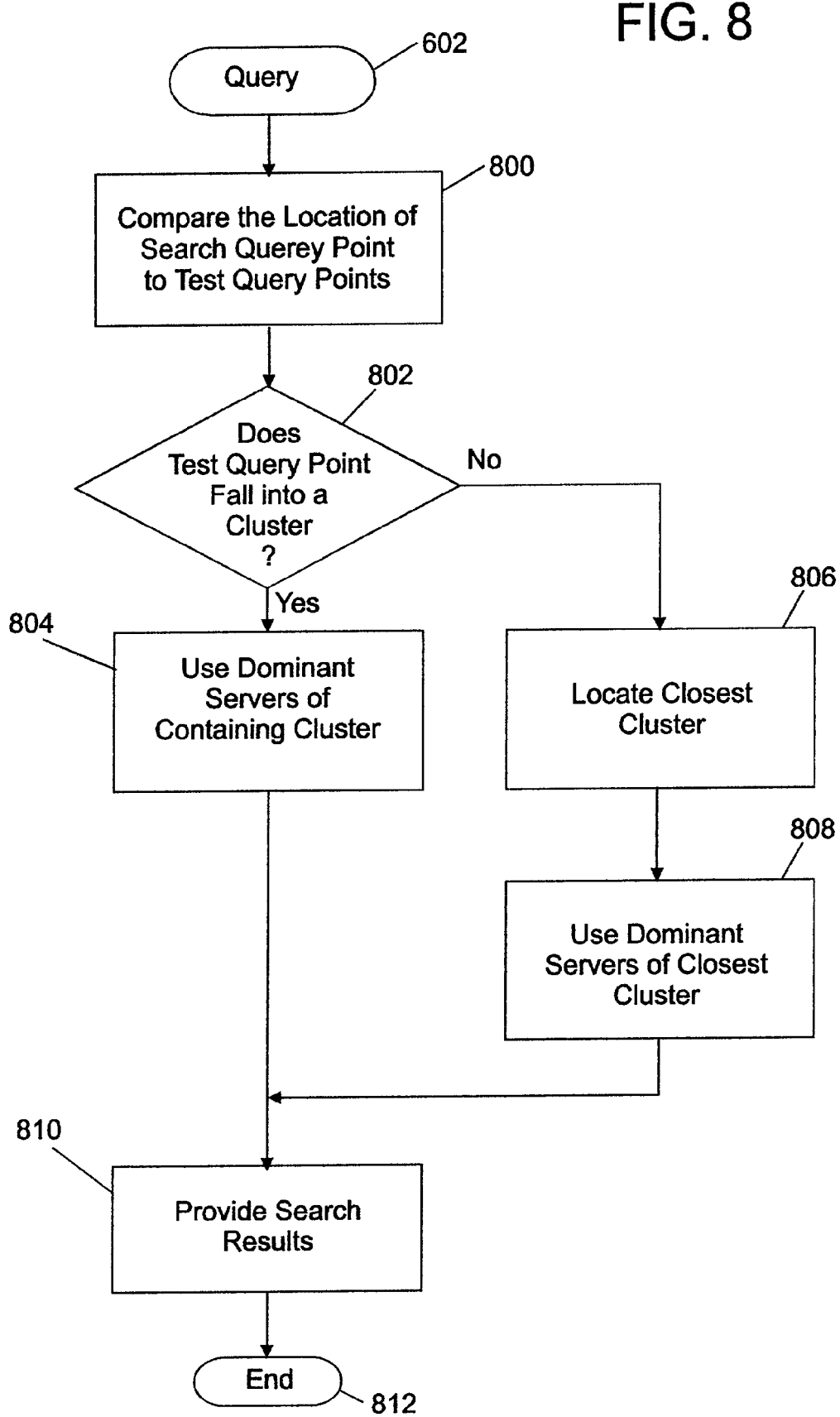
FIG. 8 is a flow diagram illustrating the query router of FIG. 7.

As shown in FIG. 8, the classifier compares the position of the query point Ps of the search query 602 with those of the query or vector points P of the test queries (steps 800 and 802). When the query point of the test query 602 of the search falls within boundaries of a cluster, the search is limited to one or more of the servers (step 804) determined to be dominant for that cluster (unless the searcher considers the search insufficient and expands it further to other of the servers based on the ranking of the servers by the meta processing scheme). In other words, limiting access by a search query $S_s$ to that subset of the data bases predetermined to be dominant in the cluster by using the sets of test queries. When the search falls outside a cluster, the location of the search query point is compared to the position of the test query points in surrounding clusters and the Euclidean distance to the nearest cluster is determined (step 806). The search is then performed with the dominant servers of that cluster (step 808) and the results given to the searcher (step 810) (unless the searcher decides that a broader search is to be performed or the search is complete).

Above we have described one embodiment of the invention and modifications of this embodiment may be apparent to those skilled in the art. For instance, the predominant database sources were selected on the basis that they provided the most queries within a cluster. Other means of their selection can be used. For instance, the dominant sources could be identified by determining which sources provided the most significant results. The queries falling within a cluster could be supplied to each of the sources SE1 to SEn and the servers returning the most highly ranked documents selected as the dominant sources for that cluster. (The ranking of the servers is based on the raw ranking data for the documents.) A more sophisticated technique of identifying dominant servers in a cluster would be to have the search results of the test queries establishing the cluster analysis used in base and meta processing. The above mentioned U.S. Pat. No. 6,886,009 filed on even date herewith, discloses the meta processing scheme shown in FIG. 5 thereof. Therefore, it should be understood that while one embodiment of the invention has been described, the invention is not limited to that invention but should be interpreted in light of the spirit and scope of the appended claims.

The invention claimed is:

1. A computer program product having executable instruction codes stored on a computer usable medium for optimizing the selection, from a plurality of servers, one or more dominant servers, to be interrogated during query searching comprising:
    a set of instruction codes for determining a particular cluster for a vector formed of search keywords $T_s$, of a search query $S_s$,
    wherein the particular cluster is within clusters of a multiaxis query space where each axis of the multiaxis query space represents one of the keywords $T_1$, $T_2$, ... $T_n$ and where clusters are identified with sets of test queries $S_t$ made up of one or more keywords defining test quiery vector points $P_c$ forming a cluster, wherein an average distance $D_a$ between vector points $P_c$ within the cluster is less than a distance $nD_a$ to an adjacent cluster where n>2;
    a set of instruction codes for selecting one or more dominant servers in the determined particular cluster;
    a set of instruction codes for limiting access by the search query $S_s$ to the selected one or more dominant servers;
    a set of instruction codes for returning one or more results of the search query $S_s$ from the selected one or more dominant servers, wherein the set of instruction codes for selecting one or more dominant servers includes a lookup table responsive to the determined particular cluster to identify one or more dominant servers in the determined particular cluster for selecting.

2. The computer program product of claim 1 wherein selecting the one or more dominant servers in the determined particular cluster is based on servers out of the plurality of servers providing test queries which contributed the most significant references.

3. The computer program product of claim 1 wherein, the set of instruction codes for determining a particular cluster includes a set of instruction codes for determining a nearest cluster when the vector of the search query $S_s$, falls outside any cluster and for accessing one or more dominant servers in that nearest cluster.

4. The computer program product of claim 3 wherein selecting the one or more dominant servers in the determined particular cluster is based on those servers out of the plurality of servers providing the most test queries falling within the determined particular cluster.

5. A computer implemented method for optimizing the selection, from a plurality of servers, one or more dominant servers, to be interrogated during query searching comprising:

determining a particular cluster for a vector formed of search keywords $T_s$ of a search query $S_s$, wherein the particular cluster is within clusters of a multiaxis query space where each axis of the multiaxis query space represents one of the keywords $T_1$, $T_2, \ldots T_n$ and where clusters are identified with sets of test queries $S_t$ made up of one or more keywords defining test query vector points $P_c$ forming a cluster, wherein an average distance $D_a$ between vector points $P_c$ within the cluster is less than a distance $nD_a$ to an adjacent cluster where n>2;

selecting one or more dominant servers in the determined particular cluster;

limiting access by the search query $S_s$ to the selected one or more dominant servers;

returning one or more results of the search query $S_s$ from the selected one or more dominant servers, wherein selecting one or more dominant servers includes a lookup table responsive to the determined particular cluster to identify one or more dominant servers in the determined particular cluster for selecting.

6. The method of claim 5 wherein determining a particular cluster includes determining a nearest cluster When the vector of the search query $S_s$ fails outside any cluster and accessing one or more dominant servers in that nearest cluster.

7. The method of claim 6 wherein, the selecting the one or more dominant servers in the predetermined particular cluster is based on servers providing test queries which contributed the most significant references.

8. The method of claim 5, wherein the selecting the one or more dominant server in the determined particular cluster is based on servers out of the plurality of servers providing test queries which contributed the most significant references.

9. The method of claim 8, wherein the contribution of the most significant references is based on raw ranking data.

10. The method of claim 9, wherein base and meta learners are used for ranking.

* * * * *